Patented Sept. 12, 1950

2,521,870

UNITED STATES PATENT OFFICE 2,521,870

DISPROPORTIONATION OF ORGANIC DISULFIDES

Wayne A. Proell, Chicago, Ill., assignor to Standard Oil Company, Chicago, Ill., a corporation of Indiana No Drawing. Application October 22, 1946, Serial No. 704,991

6 Claims. (Cl. 260—608)

This invention relates to the disproportionation of organic disulfides and it pertains more particularly to a new and improved method and means for converting disulfides containing certain radicals into disulfides containing other radicals.

Simple organic disulfides may be generally designated as $R_2S_2$ or RSSR where R may be an organic radical such for example as an alkyl, aryl, or heterocyclic radical. The lower alkyl disulfides are produced in large quantities in the refining of petroleum naphthas. Disulfides can be formed from two mercaptan molecules by elimination of hydrogen and linkage of the residues thus $RSH + HSR \rightarrow RSSR + H_2$.

Unlike organic sulfides, disulfides with widely dissimilar radicals do not normally appear to exist although certain higher members containing aliphatic and aromatic groups have been synthesized. (The Science of Petroleum, Dunstan, Nash, Brooks & Tizard, vol. III, p. 1715.) An object of my invention is to produce lower organic disulfides with very dissimilar radicals, such for example as methyl normal propyl disulfide, methyl normal butyl disulfide, methyl lauryl disulfide, etc.

It is known that disulfides may be converted into sulphonic acids, sulfonyl halides, etc., by oxidation. An object of my invention is to provide specific organic disulfides and/or specific mixtures thereof which may be utilized for producing the corresponding specific sulfonic acids, sulfonyl halides and/or other end products. A further object is to produce disulfides and/or disulfide mixtures of increased utility for use as solvents, plasticizers (for rubber, plastics, resins, etc.), rubber accelerators and compounding agents generally.

Broadly, my invention contemplates the disproportionation of organic disulfides by heating them with a solution of an alkali sulfide in a hydroxyl-type solvent, preferably in the presence of an alkali hydroxide.

As an example of my process, to a mixture of equal volumes of methyl disulfide, $(CH_3S)_2$ and n-propyl disulfide, $(C_3H_7S)_2$, are added about 10% by volume of ethyl alcohol, about 2% by weight of potassium hydroxide and about 1% by weight of sodium sulfide and the entire mixture is heated to a temperature to produce constant refluxing for a period of about three hours. The mixture is then diluted with a large amount, at least about an equal quantity, of water at ordinary temperature, separated and dried. The dried product on fractionation yields about 40% by volume of a product boiling chiefly at about 309° F. Since methyl disulfide boils at 228° F. it would appear that the product contained 40% by volume of methyl propyl disulfide, $CH_3SSC_3H_7$. The methyl propyl disulfide may be readily separated from the starting materials by simple fractionation and by recycling of unconverted disulfides almost quantitative yields may be obtained.

As another example, equal volumes of methyl disulfide and butyl disulfide, $(C_4H_9S)_2$, may be mixed and to this mixture 10% alcoholic sodium sulfide is added and the final mixture refluxed for about three to four hours. On diluting with water, drying and distilling about 33% of the product is found to be methyl n-butyl disulfide, $CH_3SSC_4H_9$, which boils at about 342° F.

The same process is applicable generally to the disproportionation of organic disulfides having the formula $(RS)_2$ where R is an alkyl, aryl, or heterocyclic radical. For example, by disproportionating dimethyl disulfide with dilauryl disulfide, methyl lauryl disulfide may be obtained. Any alkyl radical may be used from methyl to hexadecyl or higher. Examples of aryl radicals are phenyl $(C_6H_5-)$, tolyl $(C_7H_7-)$, naphthyl $(C_{10}H_7-)$, etc. Examples of heterocyclic disulfides are those prepared from mercaptobenzothiazyl and complex disulfides commonly employed in the rubber industry. The R radical may have one or more hydrogens substituted by a halogen atom or other group provided of course that the substituting group is not reactive under the conditions employed in the disproportionation reaction.

I have found that in the absence of alkali sulfide the yields of disproportionation products are very low, the yield in the presence of alkali sulfide being about tenfold that obtained in the absence of alkali sulfide.

The relative amounts of disulfides to be disproportionated may vary within a wide range but they should preferably be about equal. The hydroxyl-type solvent is preferably an alcohol and while the ethyl alcohol is perhaps most advantageous for low boiling disulfides, higher boiling alcohols, such as propyl, butyl, amyl, etc., may be employed. Only a minor amount of disproportionation is obtained when the mixed disulfides are refluxed with aqueous caustic or aqueous alkali sulfide. Other hydroxyl-type solvents include: methyl and ethyl monoethers of ethylene glycol. Usually about 5 to 50% or more, preferably about 10 to 40% of the hydroxyl-type solvent is employed based by volume on the disulfide mixture. The amount of alkali hydroxide should be in the range of 0.5 to 20% or preferably in the range of about 1 to 5% based on mixed sulfides. Usually about 0.5 to 5% by weight, e. g. about 1 or 2% of alkali sulfide, such as sodium sulfide or potassium sulfide, is sufficient to obtain excellent disproportionation. Ordinary refluxing temperatures are usually satisfactory but temperatures may be in the general range of 150 to 240° F. Ordinary atmospheric pressures are suitable but the reaction may be carried out under subatmospheric or superatmospheric pressures. The time of contact is preferably several hours, e. g. 1 to 10 hours or more.

The above process may be used to prepare difficultly obtainable mixed disulfides from known pure disulfides, or may be conversely used to prepare pure disulfides from certain freely available mixed disulfides such as ethyl methyl disulfide. It is especially useful for preparing such disulfides as t-lauryl phenyl disulfide, etc. mixed aryl alkyl disulfides useful as plasticizers because of powerful solvent action due to the aryl and S–S groups, yet liquid in contrast to purely aromatic disulfides.

I claim:

1. The method of effecting the hydrocarbon disulfide reaction $RSSR + R'SSR' \rightleftharpoons 2RSSR'$ where R and R' are different radicals selected from the group consisting of alkyl and aryl radicals, which method comprises heating a disulfide charging stock containing at least two different simple disulfides having radicals selected from the said group in the presence of an alkaline solution of an alkali sulfide in a solvent of the class consisting of water, aliphatic alcohols and methyl and ethyl monoethers of ethylene glycol.

2. The method of effecting the hydrocarbon disulfide reaction $RSSR + R'SSR' \rightleftharpoons 2RSSR'$ where R is a hydrocarbon radical and R' is a different hydrocarbon radical, which method comprises heating a hydrocarbon disulfide charging stock containing at least two different simple hydrocarbon disulfides in intimate contact with an alcoholic solution of an alkali hydroxide and an alkali sulfide.

3. The method of effecting the hydrocarbon disulfide reaction $RSSR + R'SSR' \rightleftharpoons 2RSSR'$ where R is a hydrocarbon radical and R' is a different hydrocarbon radical, which method comprises heating a hydrocarbon disulfide charging stock containing at least two different simple hydrocarbon disulfides with about 5 to 50% by volume of an hydroxyl solvent selected from the class consisting of water, alcohols and methyl and ethyl monoethers of ethylene glycol which solvent contains an amount of alkali hydroxide in the range of .5 to 20% by weight based on the disulfide charge and also contains about .5 to 5% by weight of an alkali sulfide based on the disulfide charge.

4. The method of claim 3 wherein the heating is effected at a temperature in the range of about 150 to 240° F. and for a time sufficient to effect substantial transfer of hydrocarbon radicals.

5. The method of claim 3 wherein the hydrocarbon radicals are alkyl radicals.

6. The process which comprises reacting a mixture of $(CH_3S)_2$ and $(C_3H_7S)_2$ by adding thereto about 10% by volume of ethyl alcohol, about 2% by weight of potassium hydroxide and about 1% by weight of sodium sulfide and heating the entire mixture to a temperature to produce constant refluxing for a period of about 3 hours, diluting the mixture with at least an equal quantity of water to produce two phases and subsequently drying the disulfide phase.

WAYNE A. PROELL.

REFERENCES CITED

The following references are of record in the file of this patent:

UNITED STATES PATENTS

| Number | Name | Date |
|---|---|---|
| 2,001,715 | Fischer | May 21, 1935 |
| 2,154,488 | Braker | Apr. 18, 1939 |
| 2,174,248 | Mikeska | Sept. 26, 1939 |
| 2,230,542 | Meinert | Feb. 4, 1941 |
| 2,237,627 | Olin | Apr. 8, 1941 |
| 2,259,861 | Richardson | Oct. 21, 1941 |

OTHER REFERENCES

Otto et al., Berichte, vol. 19, 3132–5 (1886).